(12) United States Patent
Kellogg

(10) Patent No.: US 12,401,843 B2
(45) Date of Patent: Aug. 26, 2025

(54) LATENCY COMPENSATION BETWEEN COORDINATED PLAYER DEVICES

(71) Applicant: John Kellogg, Los Angeles, CA (US)

(72) Inventor: John Kellogg, Los Angeles, CA (US)

( * ) Notice: Subject to any disclaimer, the term of this patent is extended or adjusted under 35 U.S.C. 154(b) by 83 days.

(21) Appl. No.: 18/384,328

(22) Filed: Oct. 26, 2023

(65) Prior Publication Data

US 2024/0196041 A1 Jun. 13, 2024

Related U.S. Application Data

(60) Provisional application No. 63/419,335, filed on Oct. 26, 2022.

(51) Int. Cl.
| | |
|---|---|
| *G11B 27/10* | (2006.01) |
| *H04N 21/414* | (2011.01) |
| *H04N 21/43* | (2011.01) |
| *H04R 3/00* | (2006.01) |
| *H04R 29/00* | (2006.01) |

(52) U.S. Cl.
CPC ......... *H04N 21/4307* (2013.01); *G11B 27/10* (2013.01); *H04N 21/41407* (2013.01); *H04R 3/00* (2013.01); *H04R 29/001* (2013.01)

(58) Field of Classification Search
CPC ......... H04N 21/4307; H04N 21/41407; G11B 27/10; H04R 3/00; H04R 29/001
See application file for complete search history.

(56) References Cited

U.S. PATENT DOCUMENTS

| | | | |
|---|---|---|---|
| 2009/0253506 A1 | 10/2009 | Ishii et al. | |
| 2015/0062022 A1* | 3/2015 | Rabii | G06F 3/041 |
| | | | 345/173 |
| 2016/0165227 A1 | 6/2016 | Babbar et al. | |
| 2019/0297421 A1 | 9/2019 | Beltran et al. | |
| 2020/0007306 A1 | 1/2020 | Mizuno et al. | |
| 2021/0195256 A1* | 6/2021 | Bouvigne | H04N 21/23611 |
| 2021/0344973 A1* | 11/2021 | Galloway | H04N 21/218 |
| 2022/0124425 A1 | 4/2022 | Jo et al. | |

OTHER PUBLICATIONS

PCT/US23/36048 ISR and Written Opinion.
VR and AR Content Management System (CMS) retrieved from https://headjack.io, 2024, 18 pages.
True Australian Provisional Application No. 2021903720 filed on Nov. 18, 2021.

* cited by examiner

*Primary Examiner* — Thai Q Tran
*Assistant Examiner* — Jose M Mesa
(74) *Attorney, Agent, or Firm* — ONE LLP

(57) ABSTRACT

An apparatus and method for simultaneous output of video from a head-mounted display device and audio output from an external sound system includes compensating for latency in the external sound system relative to the head-mounted display. The latency is measured by outputting test content using one of alternative methods.

20 Claims, 12 Drawing Sheets

FIG. 4 - Immersive Audio Speaker and Binaural Hybrid

FIG. 5 - playback with streaming device or game console as Source

FIG. 6 - Media Loading and Sync

FIG. 7 - Media Management and Playback

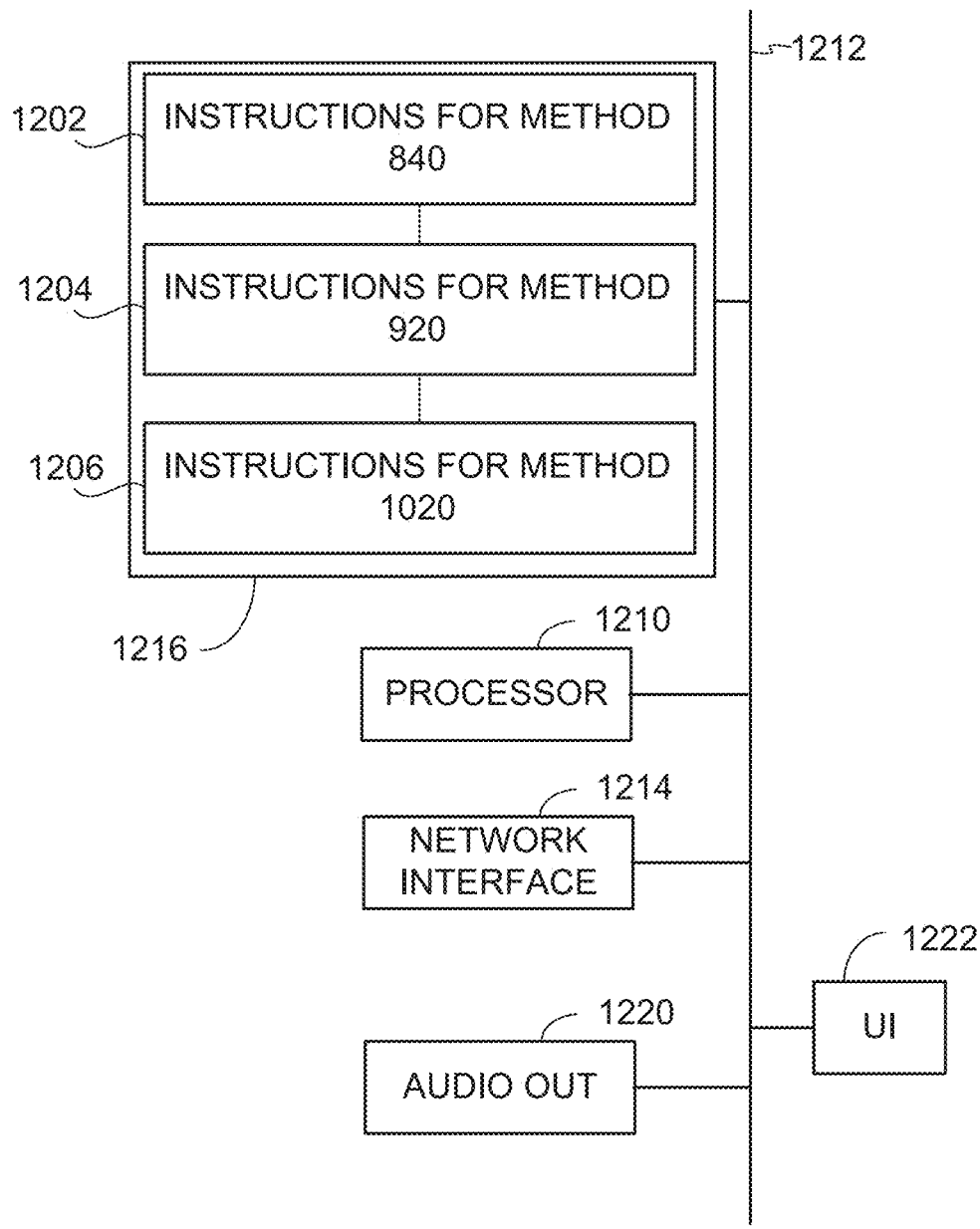

LATENCY COMPENSATION BETWEEN COORDINATED PLAYER DEVICES

CROSS-REFERENCE TO RELATED APPLICATIONS

The present application claims priority to U.S. Provisional Patent Application Ser. No. 63/419,335 filed Oct. 26, 2023, which is are incorporated herein by reference.

FIELD

The present application relates to systems, methods, and apparatus for latency compensation between coordinated player devices for example in providing cinematic audio and video for virtual reality (VR) playback.

BACKGROUND

The audio component of VR is too often relegated to substandard headphone audio or inferior audio playback in the head-mounted VR display itself. For example, current virtual reality systems are not integrated into the typical consumer's home theater entertainment system, preventing VR consumers from enjoying a virtual reality experience with the cinematic immersive sound they enjoy in their home systems.

In addition, video quality in VR playback is compromised and inconsistent. Playback quality for VR in a head mounted display (HMD) player device, sometimes referred to herein as an 'HMD,' is inconsistent among models of HMDs, and even among VR video player applications within the HMD. These inconsistencies present a problem for VR content creators as to what compression, video specs, and color profiles to deliver. Additionally, inconsistency in player quality and specifications often requires multiple deliverables for each VR system or playback application to achieve consumer satisfaction.

HMD manufacturers can supply a higher quality of playback by 'tethering' or cabling the HMD to a higher end and higher cost PC, thereby isolating the user from their typical (non-PC) home entertainment products. This lack of wireless capability adds inconvenience, cost and complexity resulting in an inferior user experience and diminished ease of use. In addition, when tethering is used, multiple separately tethered users will have difficulties with cables when sharing the same VR entertainment experience together as they would watching a movie or streaming program.

It would be desirable, therefore, to develop new methods and other new technologies for providing cinematic audio in conjunction with virtual reality (VR) playback, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a virtual reality wireless immersive audio and video player may be embodied as a multi-application software system or method which addresses the deficiencies noted above. Though it is intended as a consumer facing system for the home, it can be used for professional location based virtual reality venues and presentations.

In an aspect, a method for synchronizing audio output by an external sound system driven by a host player device with video output from a head-mounted display (HMD) player device may include establishing a session between the host player device and the HMD player device, wherein the host player device is coupled to an external sound system and the HMD player device comprises a video output system. The method may further include determining, by at least one of the host player device or HMD player device, a latency period between audio output from the external sound system and corresponding video output from the HMD player device, wherein the determining is based on both the host and HMD player devices simultaneously initiating play of test content. The method may further include providing, by the host player device, both the host and HMD player devices with access to identical digital audio-video content selected by a user, and initiating play of the digital audio-video content by the host player device for audio output by the external sound system. The method may include initiating play of the digital audio-video content by the HMD player device after waiting for the latency period so that audio output by the external sound system is synchronized with video output from the HMD player device.

In an aspect, the method may include determining the latency period based on user input received by the host player device in response to contemporaneous output of the test content from the host and HMD player devices. In an alternative, or in addition, the method may include determining the latency period based on detecting, by at least one of the host player device or HMD player device, a lag between audio output from the external sound system and corresponding video output from the HMD player device, wherein both the host and HMD player devices simultaneously initiate play of the test content. In an aspect, the host player device sends a wireless signal to the HMD player device to instruct initiation of the corresponding video output. The signal may include at least one of an audio signal or an optical signal emitted by the external sound system.

In another aspect of the method, establishing a session may further include verifying a connection between first and second applications. The establishing may be done over a WiFi or other suitable network. The method may further include signaling by the HMD player device to the host player device that the HMD player device is ready to play content.

The method may further include ensuring, by the host player device in cooperation with the HMD player device, that the host player device and the HMD player device contain identical copies of the digital audio-video content. This may further include querying by the host player device whether the memory of the HMD player device contains a copy of the digital audio-video content, and copying the content to be played from the host player device to the HMD player device.

The method may include causing deletion after play, by at least one of host player device or the HMD player device, of the digital audio-video content on the HMD player device based on satisfaction of a predetermined condition. The predetermined condition may include at least one of: number of plays, a time-period, or a license type.

The method may include displaying by the host player device at least one of: a navigation screen with playback controls and latency compensation, video output of the digital audio-video content, overlaid navigation controls, or a 3D video output version of the digital audio-video content. In an aspect, the external sound system may include a home theater system.

The system or method may incorporate specific content workflow and preparation of the VR media files; providing consistency of image quality by specifying the file video and audio deliverables ideally matched to playback software and HMD; supporting wireless HMD player device video playback that can be used simultaneously by multiple users with low bandwidth requirements; and synchronized full immersive home theater and cinema style audio played on a consumer's home entertainment audio system, sound-bar or other audio device. The system or method can be used with speakers, open air or bone induction headphones or a hybrid combination of speakers in the room and integrated audio speakers in the HMD player device for enhanced audio effects.

A system for practicing the method as described herein may sometimes be referred to as an "AudioSync"™ system. As used herein, a 'player device,' 'host device' or 'server' may include at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a 'processor' means a computer processor. A client device, host device or server may be configured as a 'player device' that outputs audio and/or video output by playing digital audio-video content.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 12 is a conceptual block diagram illustrating components of an apparatus or system for an HMD player device.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

Figure 1:
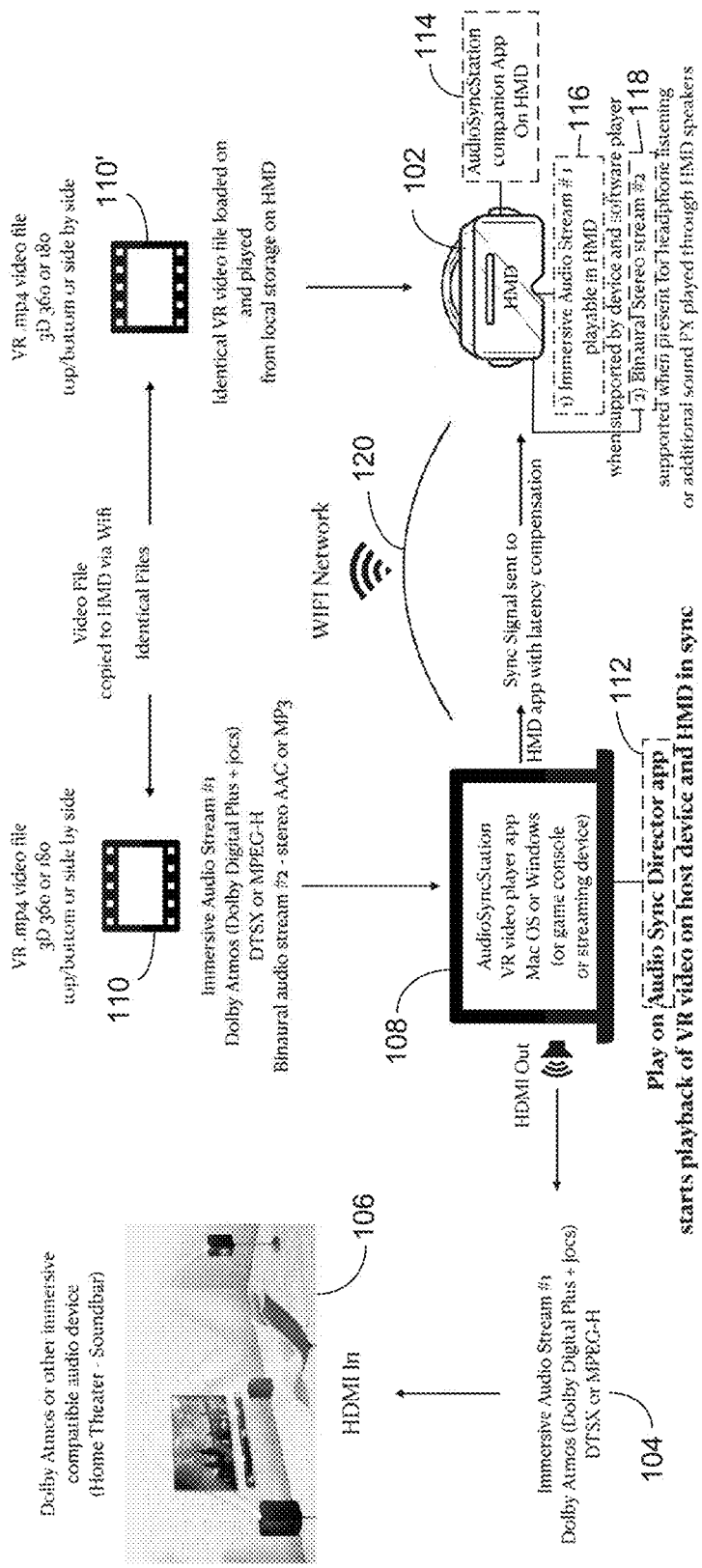
FIG. 1 is a schematic diagram illustrating an overview of a virtual reality wireless immersive audio and video player system.

Referring to FIG. 1, an AudioSync Director Virtual Reality video and audio player system 100 enables a user or multiple users to watch and experience 2D 360 or 180 3D or other virtual reality video on a head-mounted display (HMD) player device 102 synchronized with immersive multi-channel audio 104 which includes but need not be limited to Dolby Atmos, DTSX, MPEGH, Auro3D, or other current or future immersive audio formats. The VR media file is played back on an audio system 106 capable of playing surround or immersive audio, such as a multi-channel Dolby Atmos/DTSX/MPEGH home theater system or sound-bar. This system 106 may be configured for use in a consumer home theater entertainment system, professional cinema or location based VR venue, for example. The host playback device 108 may include but need not be limited to Apple computers (MacOS), Android, Linux or Windows based computers, tablets, phones, gaming consoles or streaming devices.

While playback on a wireless HMD player device 102 is preferred, the system can also be implemented for a single user with tethered AR/VR head mounted displays or glasses systems, including but not limited to Magic Leap, NReal, Sony PS5, Varjo and other current and forthcoming devices.

The system 100 may include various components, including, for example: (1) The VR video/audio content 110, 110'—production and customization; and (2) The AudioSync Director playback software application 112 on a 'host device'. A host device may be, or may include, a computer, game console, streaming device, tablet or phone. The components may include (3) an AudioSync playback companion application 114 installed on a player device, for example, on an HMD 102 for playing VR content, and (4) a delay compensation method and system implemented by a combination of the AudioSync Director application 112 and AudioSynce playback application 114 in cooperation with the host player device 108 and HMD player device 114. 'Delay' may also be referred to herein as 'latency.'

The AudioSync Director application 112 currently exists as software for Mac OS, Android, OpenXR and Meta Quest 2, Meta Quest 3 and Meta Quest Pro HMD player devices and may also be deployed to Windows or Android based systems, Linux, other proprietary OS systems and game consoles, tablets, phones or streaming devices, sometimes herein referred to as 'host devices. The HMD companion application 114 can be used on any HMD player device with tethered or wireless capability including but not limited to Meta Quest devices, Pico, Apple or other consumer or enterprise HMD VR devices 102. It can be used on tethered single user devices that include but not limited to Magic Leap, Varjo, Nreal and other AR/VR devices.

Figure 2:
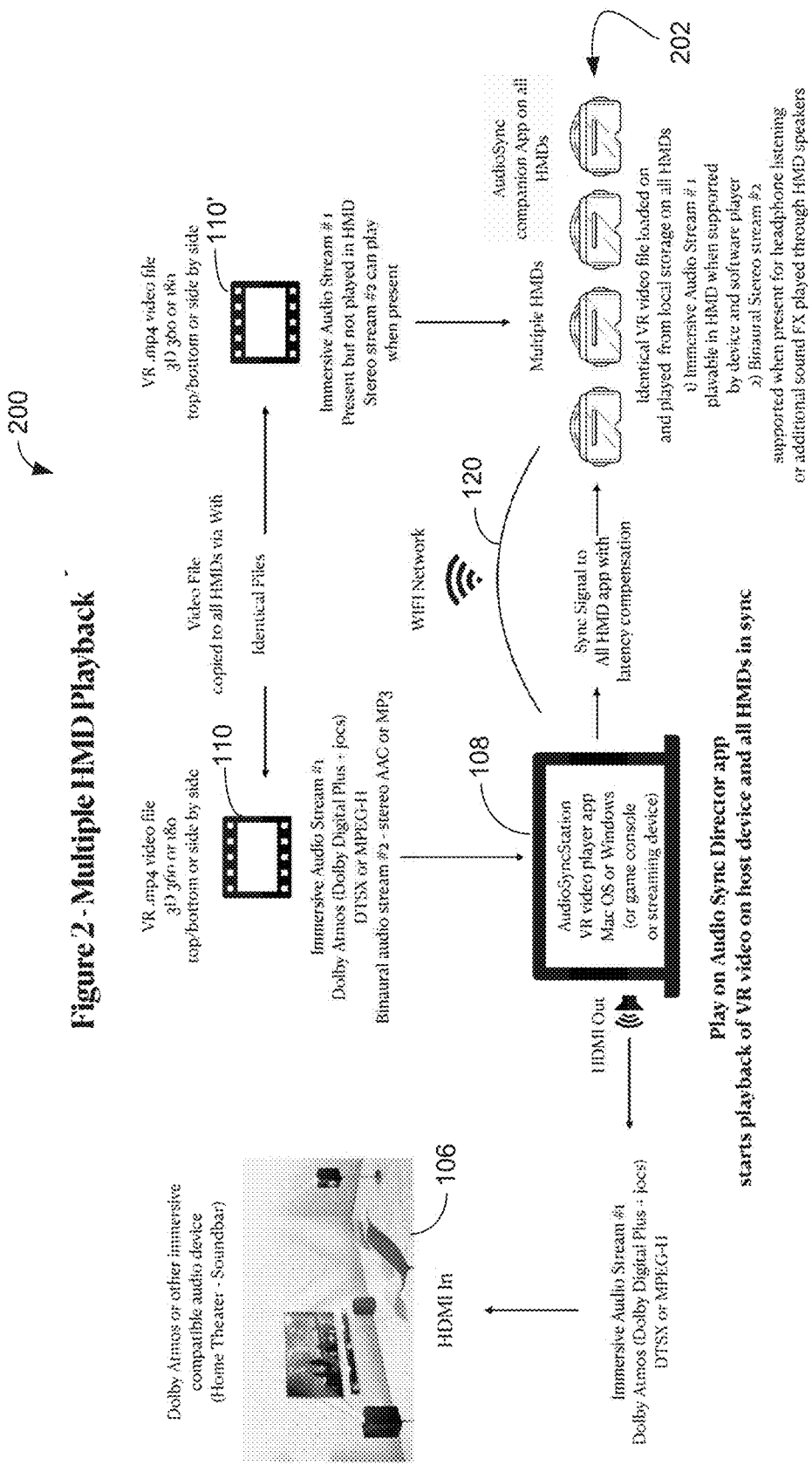
FIG. 2 is a schematic diagram illustrating a system modified for multiple HMD player devices.

As shown in FIG. 2, a multiple-HMD system 200 may be configured similarly to the previously described single-HMD system 100, but with multiple HMD player devices 202 all connected to the same host player device 108. Each of the HMD player devices 202 may be synchronized to the host player device 108 and to each other using the configurations and methods disclosed herein for a single HMD player device 102.

Figure 3:
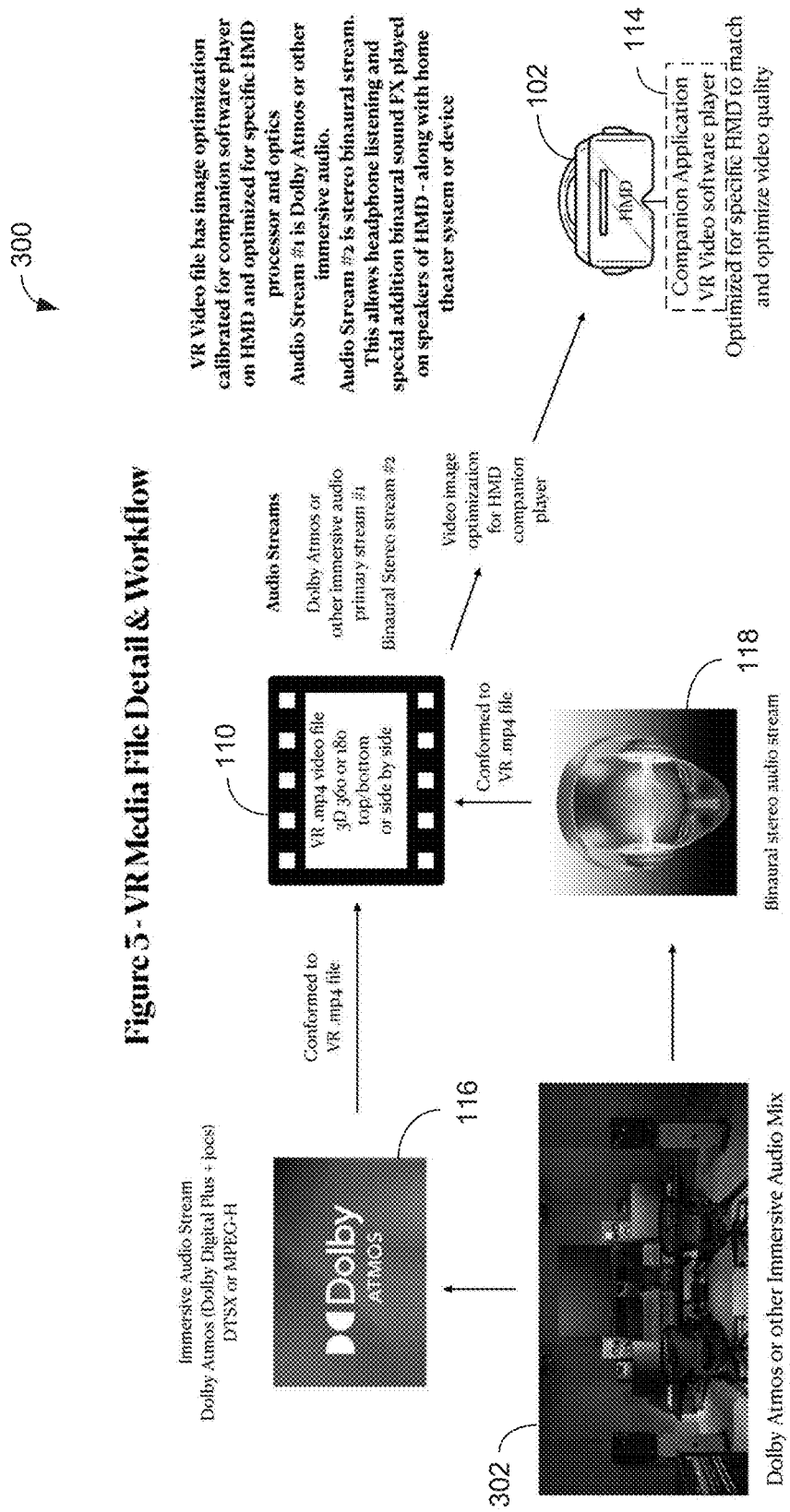
FIG. 3 is a schematic diagram illustrating virtual reality media file detail and workflow for a system as described herein.

VR Video Content: Referring to FIG. 3, the system may be designed to use an industry standard format file 110, for example, .mp4 or .mov or other commonly supported video file that uses an industry standard h.264 or h.265 video or other industry accepted video codec. The video image can be a "top/bottom" or "side by side" 3D video image with a 360 or 180 degree field of view. Such video files for immersive VR content may sometimes be referred to herein as "digital audio-video content."

The virtual reality video file 110 may be created as a traditional industry standard .mp4 or .mov file with specific video specifications as to bit-rate, color profile, file size and bandwidth to be consistent with playback specifications for the companion video playback application 114 on the HMD player device 102. This ensures highest quality video image playback consistency and quality desired and designated by the content creator, providing an enhanced user experience.

An immersive or surround multi-channel soundtrack is created for the VR video presentation (movie). This includes but is not limited to surround channel formats such as quad 4.0, 5.0, 5.1, 6.0, 6.1, 7.1 and immersive channel or object based audio formats such as 7.1.2, 7.1.4, 9.1.2, 9.1.4, currently up to 22.2. There is no limit to the number of channels or speakers used.

A custom immersive soundtrack 116 (Dolby Atmos as a typical example) may be created for the VR video presentation. This audio soundtrack file 116 may be then conformed to the VR video file to create a customized virtual reality cinematic experience with full immersive multi-channel audio. This audio portion of the VR video may be deployed as an immersive soundtrack (typically 7.1.4) including but need not be limited to Dolby Atmos, DTSX, MPEGH, Auro 3D or CX or other currently existing or future immersive audio bitstream formats. The audio may be delivered by an audio codec including but not limited to Dolby Digital Plus+jocs (joint object coding) "Atmos" bitstream. The immersive soundtrack may be output by an external sound system 106 (FIGS. 1-2).

As an example: The Dolby Atmos audio 302 is industry standard, up to 7.1.4 channels and must be created and produced with standard Dolby Atmos audio production workflow using (but not limited to) Dolby's or other currently available software tools from Avid, Apple, Yamaha or other audio software developers now and in the future. The final Atmos mix is then exported via Dolby's software toolset or toolset integrated into the (DAW digital audio workstation software) to the Dolby Digital Plus+joc bitstream as a final deliverable. This bitstream is then conformed to the VR video file to create a VR video file with Dolby Atmos, DTSX, Auro 3D of CX or other immersive audio.

Figure 4:
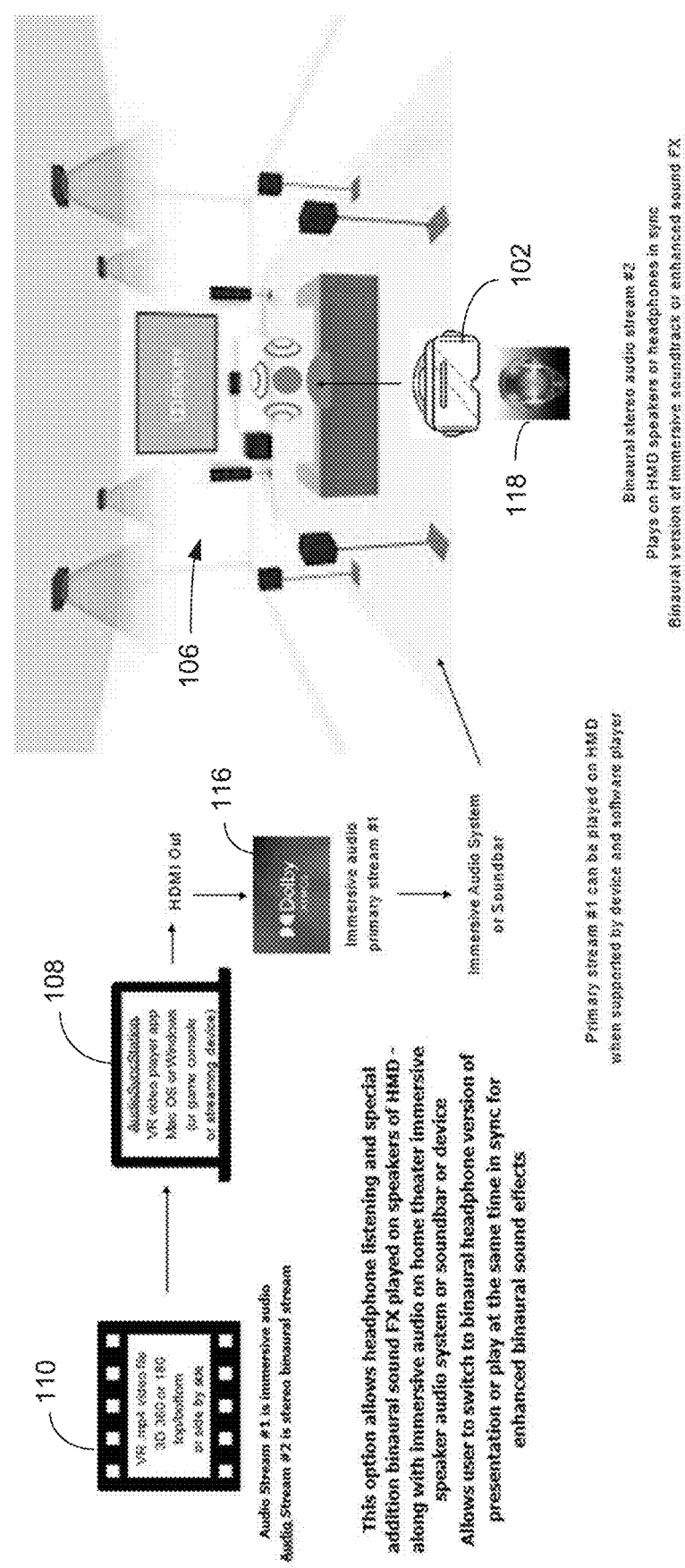
FIG. 4 is a schematic diagram illustrating aspects of the system for an immersive audio speaker and binaural hybrid.

Referring to FIG. 4, a system 100 may include the VR video file 110 configured to have two soundtracks. The primary soundtrack 116 is the immersive audio track as described above. This typically is the first audio stream, herein referred to as primary stream #1, for output by the external sound system 106 or soundbar. The second soundtrack 118 may be a stereo binaural stream using a commonly used audio codec such as MP3 or AAC or other widely used stereo audio stream. This stereo stream can be either a binaural version of the immersive soundtrack in primary stream #1 that users can listen to on headphones with the HMD player device or on small speakers on the HMD player device 102 itself. This stream shall herein be referred to as 'secondary stream #2.

Another use of the secondary stream #2 as stereo or binaural audio stream 118 may include a 'hybrid' method where additional audio effects, sounds or audio enhancements can be played simultaneously through the built-in speakers of the HMD, or headphones along with the immersive audio system playing in user's room via their home theater or sound-bar. This secondary stream of audio may sometimes be referred to herein as "auxiliary audio" content.

Referring again to FIGS. 1-2, the VR video file 110, 110' may be duplicated on the HMD player device 102 by copying it from the host player device 108 and application 112 and stored in local storage on both the host player device and the HMD player device. The files may also be stored and utilized on external storage, for example, external hard drives, SD cards or USB drives. The AudioSync Director software application 112 may be located on the host player device 108, for example, a computer, game console, tablet, phone or streaming device.

The AudioSync companion software application is located on the HMD player device 102 or on each of the multiple HMD player devices 202. Both the host player device 108 and each HMD player device 102 may be connected to and logged on to the same WiFi network 120, or equivalent local area wireless network.

The applications 112, 114 may be configured such that when both the AudioSync Director application 112 and the companion application 114 on the HMD player device 102 on the same wireless network 120 and launched, the two applications detect each other on the network. The companion application may output an indication for output on a display of the HMD player device 102 that the companion application 114 is connected to the application 112 on the host player device 108, establishing a play session in which the applications 112, 114 will cooperate to synchronize audio output from the external sound system 106 with video output from the HMD player device 102.

Figure 5:
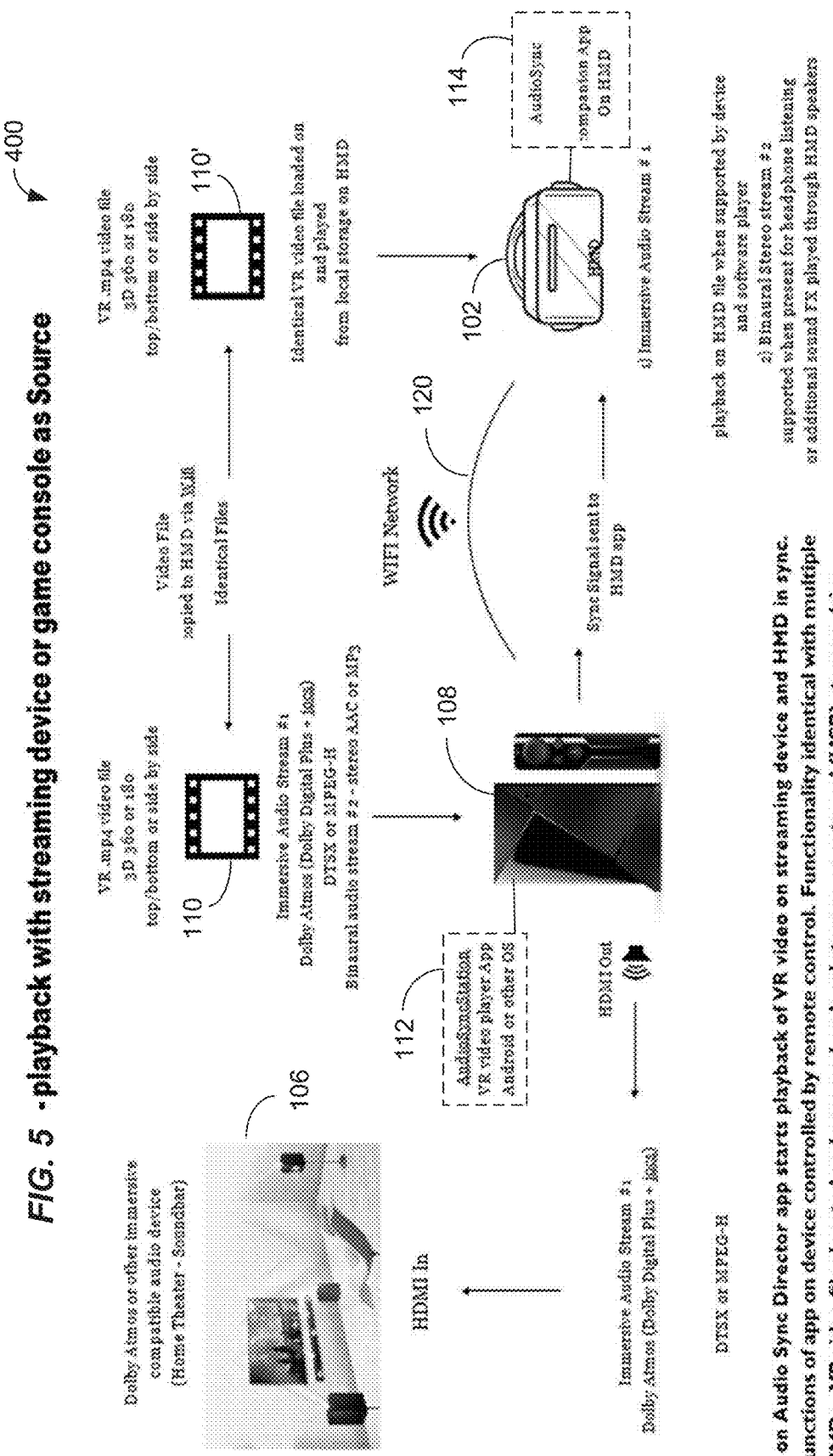
FIG. 5 is a flow diagram illustrating a method for latency correction is a system 100 with streaming device or game console as source.
Figure 6:
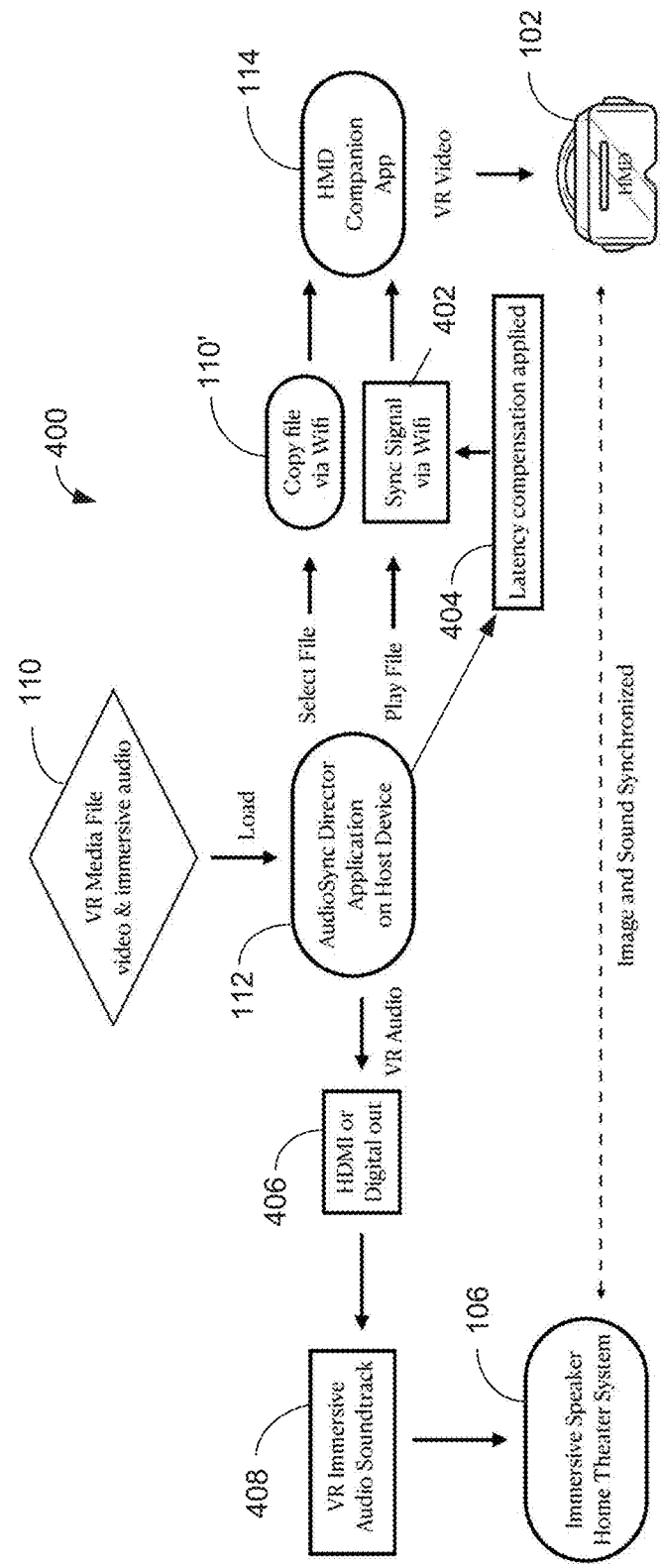
FIG. 6 is a flow diagram illustrating alternative aspects of the method for media loading and synchronization in a virtual reality wireless immersive audio and video player system as described herein.
Figure 7:
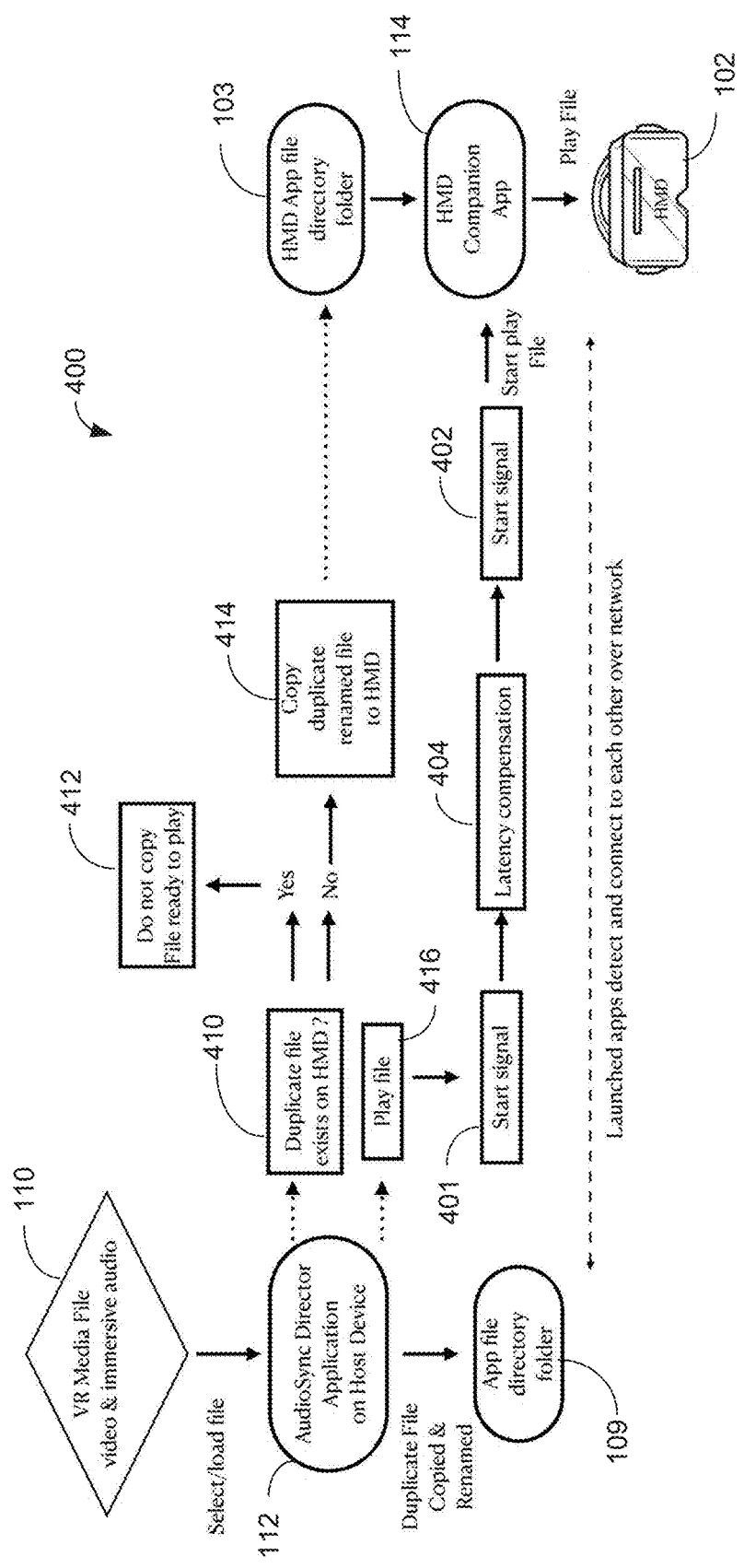
FIG. 7 is a flow chart illustrating alternative aspects of the method for media management and playback in a virtual reality wireless immersive audio and video player system as described herein.

Referring to FIGS. 5-7, aspects of a method 400 for synchronizing audio output by an external sound system 106 driven by a host player device 108 with video output from an HMD player device 102 are shown.

A VR video file 110 containing digital audio-video content may be selected for the first time by user interaction with the AudioSync Director software 112 on the host player device 108. The following occurs:

The AudioSync Director application 112 creates a duplicate 110' of the file 110 in its directory/local library folder. The copy 110' is created with a unique renaming of the file.

When it is launched, the companion application 114 on the HMD player device 102 connects to the same Wi-Fi network 120 as the host player device 108. The host player device determines 410 (FIG. 7) whether a copy of the digital audo-video content 110 exists on the HMD player device 102. If the copy 110' exists, the host player device 108 does not make a copy 412. If the files does not exist, the host player device renames and copies 414 the content file as previously described herein.

Once connected to the host player device 108 via the network 120, the HMD player device 102 detects the file 110' containing the digital audio-video content and immediately copies the file with unique re-naming to local storage 103 in the HMD player device 102 over the Wi-Fi network 120. This duplicates the VR file 110' on the HMD as a uniquely renamed copy of the original file 110 contained in local storage 109 of the host device.

The companion application 114 reports the progress of copying or 'downloading' the file on the screen of the HMD player device 102, visible to the user. Once copying the file to the HMD player device is complete, the companion application on the HMD player device visually reports the completion of copying of the file and indicates on the HMD player device screen that the digital audio-video content is ready to play.

The file copying process between the host device application 112 and the companion application 114 on the HMD player device occurs the first time the file is selected by the user in the application on the host device because the file copy 110' is not present on the HMD. If the file is already present in the directory of the HMD player device 102, the copying process does not happen again unless and until the user or a system component deletes the file 110' from local storage of the HMD player device.

Once the file is stored locally on the HMD player device, and the user initiates start/play on the host device 108 by interacting with the AudioSync Director application 112, playback of the file 110 commences immediately on the host player device 108 and simultaneously preparation for playback of the duplicate file 110' commences on the HMD player device 102.

The companion application 114 detects the uniquely named file 110' from the host player device 108 that has been requested to play via the AudioSync Director application 112. As soon as the companion application 114 detects a 'start' sync signal 402 (FIG. 6) from the host player device 108 over the WiFi network, the HMD player device 102 initiates playback of the identical duplicate file 110' from local storage. Thus, the 'start' signal from the AudioSync Director application 112 triggers initiation of playback of the VR video file 110' on the HMD player device 102. The 'start' sync signal is generated after applying 404 (FIG. 6) a latency compensating wait period by the AudioSync Director player application 112 on the host device 108. The AudioSync Director application 112 sends the 'start' sync signal sent via the wireless network 120 to the companion application 114 on the HMD player device 102. Thus, playback of the VR video file on the HMD player device 102 is synchronized with immersive audio output by the external sound system 106 from playback of the content by the host player device 108.

The latency arises from transmission and output processing between the host player device 108 and the external sound system 106. The host player device 108 may be connected to a user's immersive audio capable system 106 or sound-bar via HDMI or other digital output. The AudioSync Director application 112 plays the VR video and outputs 406 (FIG. 6) an immersive audio bitstream 408 from the HDMI or digital output of the host player device 108. The routing of the digital immersive audio stream and subsequent decoding and processing in the external audio system 106 or sound-bar causes latency. The image and sound will not be synchronized. The audio will appear late to the picture, if not corrected. The latency may usually be less than one second (e.g., 10-100 ms) depending on the system, enough to be perceivable by the user. As a result, while watching the video portion of the VR file in the HMD, the audio output by the external sound system will be delayed, late and out of sync with the image in the HMD player device.

Applying latency compensation 404 during playback eliminates perceivable synchronization error in the systems 100, 200 and is described below:

To remedy latency and bring the audio portion playing from the host player device 108 into sync with the video portion playing from the HMD player device 102, latency compensation is programmed into the AudioSync Director application 112 operating on the host device 108.

The latency compensation may include a delay built into the AudioSync Director application 112 on the host player device that delays the play/start signal sent to the companion application 114 on the HMD player device 102 over the wireless network 120. This delays the playback of the file 110' on the HMD player device by several milliseconds later than the playback of the file 110 on the host device.

Consequently, the video portion of the VR file 110' starts slightly later on the HMD player device 102 than the playback of the corresponding file 110 by the host player device 108, which compensates for the delay caused by additional routing to HDMI and decoding/processing of the audio in the host device 108 and external audio system 106. Thus, the video output from the HMD player device and the immersive audio output from the external system 106 or sound-bar are synchronized.

The amount of latency compensation in the AudioSync Director application 108 on the host device may be variable and adjustable by the user or automatically by the system. This allows adjustability in the event the user has any given variations of latency that may occur in HDMI cabling, audio decoding or processing in the external audio system or device.

The user initiates 401 (FIG. 7) play of VR video file with immersive audio track on the AudioSync Director application on the host device. The sync signal 402 with latency compensation 404 applied is provided from the host player device 108 over a wireless or wired connection to the HMD player device 102.

The companion application 114 detects the start sync signal and begins playback of the identical video file on the HMD player device. Both files begin to play synchronized with the immersive audio stream decoded and synchronized on the user's external immersive sound system 106.

Multiple HMD player devices 202 can be used wirelessly with the same time playing the same program material simultaneously as described above if all have the companion application 114 installed on each of the multiple HMD player devices.

AudioSyncDirector Software Application: The AudioSync Director Software application 112 for Mac OS, Windows, Linux, Android, OpenXR or other software video player may have the following functions:

Selection and playback of the VR video file with the immersive audio soundtrack outputting the immersive audio bitstream including but not be limited to Dolby Atmos, DTSX, MPEGH, Auro 3D or CX or other current or future formats from the digital output or HDMI output of the device including but need not be limited to Apple computers (Mac OS), PC, Android, OpenXR, Linux, game console, tablet, phone or streaming devices. These are known herein as 'host devices'.

Once the VR video file is selected and loaded, the AudioSync Director application manages the transfer of the VR video file the user wishes to play with the AudioSync companion application to local storage of an HMD player device. The transfer may be executed over a wireless local area network that both the host device and HMD player device are logged on to. File copying may also be executed across a wired system (also known as a tethered system). When the application on HMD detects the application on the host device and the VR video file selected and is loaded by the user, the file may be automatically copied to the local storage of the HMD where it is played by the companion application on the HMD.

Once the file is copied into the local storage of the HMD it does not have to be copied again in the future unless it is deleted from local storage on the HMD. If the video file is present on the HMD and the user selects the file again on the AudioSync Director application—the companion application on the HMD will launch it and be ready to play it. A message confirming may be displayed on the HMD display screen.

Upon starting playback of the VR video file on the AudioSync Director software, the application generates a start/sync signal delayed a few milliseconds (providing latency compensation) from the application on the host device to the HMD companion app commencing the synchronized playback of the identical video file on the HMD. The video portion on the HMD plays in sync with the audio output from the host device and external audio system.

The immersive audio bitstream of the VR video file is output from the host device via the digital audio outputs of the host device including but need not be limited to HDMI, Thunderbolt or USBC. This immersive audio bitstream may be routed to the HDMI input or digital input of the user's immersive audio capable sound system or sound-bar for decoding, processing and audio playback.

This method and system can be used in a professional cinema or location based VR environment or venue or home entertainment environment.

AudioSyncStation Companion App for HMD player devices: The AudioSync companion app 114 for is an application for any VR/AR HMD player device that is configured to cooperate with the AudioSync Director application 112 on a host device in that it will play the .mp4 video described in VR Video content above, or other suitable file format. The functionality and use may be as follows:

The companion application is installed on the user's HMD. The HMD and host device are connected to and logged into the same wifi network. The user launches the applications on both the host device and the HMD.

The AudioSync Director application on the host device and the companion app on the HMD player device detect each other over the same communication network.

The user selects a VR video to play on the AudioSync Director app on the host device. A duplicate video with different naming configuration is copied into the directory/library folder of the AudioSync Director app on the host device.

The companion application detects the user has selected a video on the AudioSync Director application. If the video file does not already exist in the directory of the companion application on the HMD player device, the Host device application immediately uploads the video file the user has selected on the application on the host device and copies the file via a wireless or wired connection to the local storage (or external storage) on the HMD.

This copying progress may be displayed on the screen of the HMD while in process. When copying/uploading of the file to the HMD player device is complete, the companion app may display an onscreen message in the HMD device that the file is present and ready for playback.

The companion application on the HMD awaits a start play signal from the AudioSync Director application on the host device. Once play is initiated on the host device application, a latency compensated start/play signal is sent over the wireless network to the companion app in the HMD player device. The start/play signal sent to the companion application is delayed by a few milliseconds to compensate for latency caused in the host device and external audio system. Once playback is initiated on the AudioSync Director application both videos on the host device and the companion app begin to play in synchronization—the image in the HMD and the audio from the host device and external audio system.

The companion application on the HMD can play the primary immersive audio stream (stream #1) of the VR video file if that type of audio file is supported on the HMD player device and playback software. Users can play this option through the speakers on the HMD or headphones if they choose this option.

The companion application on the HMD will play an industry standard stereo or binaural stream as audio stream #2 through the built-in speakers of the HMD or with headphones if the user chooses this option.

Example: In-Use Case: The user connects their host device via HDMI to the immersive audio system of their home entertainment system capable of playing back Dolby Atmos, DTSX, MPEGH, Auro 3D or CX or other audio streams on an immersive compatible home theater system or sound bar.

The AudioSync Director software application is installed on the user's host device.

The user has an HMD player device with the AudioSync companion application installed on it.

Both the host player device and the HMD player device are connected and logged on to the same local network.

A VR video file with an immersive audio stream is selected by the user and loaded on to the AudioSync Director application on the host device either locally or downloaded from a server or cloud.

The user installs and launches AudioSync companion app on their HMD player device.

The host application and companion application detect each other on the same local network.

When the video file is selected on the host device application, the companion app detects whether it has a copy of that file in its directory in local storage on the HMD. If it does not, the host device app immediately copies the video file with a re-naming configuration from the directory of the host device application across WiFi to the HMD companion application and the local storage (or external storage) of the HMD player device.

The HMD player device displays the copying/downloading status on its screen. When copying is complete, the companion app displays a message that the file copying is complete, and the file is ready to play.

There are now identical digital audio video files on both the computer or host device application and on the HMD.

If the identical file already exists in the directory in local storage of the HMD, the companion app selects it and displays a message on its display that the file is ready to play.

The companion application awaits a start/play command from the host device.

For first use, the user either A) runs a test digital audio video file that plays audio and video test signals allowing the user can see and hear the latency between the audio outputting from the external audio system and the video displaying in the HMD device. The user adjusts the latency compensation control on the host device application (AudioSync Director) using the host device remote control to adjust the latency compensation value displayed on the video monitor or TV connected to the Host device until the audio signal outputting from the external audio system is in sync with the video signal displayed in the HMD device. Or B) the user initiates an automatic latency compensation software routine where a test digital audio video file or software in the host device generates an audio test signal from the host device and external audio system that is detected by the microphones built into the HMD device and determines the lag or latency of the time the audio signal arrives at the HMD, calculates the latency compensation value, sends that value back to the host device and sets the latency compensation setting on the host device player application. Or alternatively, C) the user initiates an automatic latency compensation software routine where a test digital audio video file or software in the host device generates a video test signal from the host device that is displayed on a video monitor or TV connected to the host device that is detected by the cameras built into the HMD device and determines the lag or latency of time the video signal arrives at the HMD cameras from the host device screen, calculates the latency compensation value and sends that value back to the host device and sets the latency compensation setting on the host device player application. Or the user initiates an automatic latency compensation setting routine that is a combination of B and C. Once the latency compensation value is set on the host device player application, the files are ready to play.

The user initiates start/play on the host device application and the AudioSync Director application generates a start/play signal with latency compensation applied to HMD that is delayed by a few milliseconds to compensate for audio delay caused by the host device and external audio system.

Both video file will begin to play simultaneously on both the host device and the HMD. The VR video image in the HMD will play synchronized with the immersive audio portion playing out of the HDMI output of the host device into the HDMI input of the Dolby Atmos, DTSX, MPEGH, Auro 3D or CX or other immersive or surround compatible audio device or system.

The AudioSync Director application on the host device compensates for any latency caused by audio signal flow, decoding and processing in the external audio device so that the audio is in sync with the video playback in the HMD.

The user now enjoys a virtual reality narrative experience with full surround or 7.1.4 or higher immersive cinematic audio with the video image component playing in sync in the HMD wirelessly. Multiple users can enjoy the same experience with multiple HMD's with the companion app installed on all of them. A single host device can drive and connect to multiple HMDs.

If the user decides they do not wish to use their home entertainment immersive speaker system—the immersive soundtrack can be played from their HMD player device from the primary immersive stream #1, if that audio format is supported, or secondary stereo or binaural secondary audio stream #2 in the VR video file on headphones for from the speakers on their HMD. This use case could be for late night or private listening.

As another option—the user is enjoying their VR experience with their immersive home theater sound system—but secondary track #2 in the VR video file contains additional enhanced sound effects that can be played through the speakers built into the HMD at the same time as the full immersive audio presentation on the users home theater system giving the user an enhanced VR audio experience with proximity effects utilizing both the speaker system and built-in speakers in the HMD.

Alternative approaches for playback of a narrative cinematic VR experience as described may include using VR video playback software on a host device to stream the video and audio via a network to a companion application on the HMD. Disadvantages of this approach may include high bandwidth requirements, lack of support for synchronization or utilization of actual immersive audio or external surround audio, limitation of audio output to the HMD via a cable tethered or Bluetooth which have latency issues resulting in complexity and poor user experience, and restriction to a single user. Multiple HMDs could not easily be used with stable synchronization of image or sound therefore only a single user can enjoy the experience.

Another approach might include uploading the VR Video to the cloud for later download to synchronized HMD devices driven by a computer or tablet content management system such as the Headjack system (https://headjack.io/). Disadvantages of this methodology may include: high bandwidth needed for uploading and downloading to a cloud based system and corresponding delay; limitation to content management systems processing in the cloud which compromises the video content and force users into lower quality versions and a lower quality experience; synchronization between HMD's and control devices is not stable and can exhibit latency issues, and immersive audio is not supported.

The present system and methods do not suffer from these disadvantages.

Figure 8:
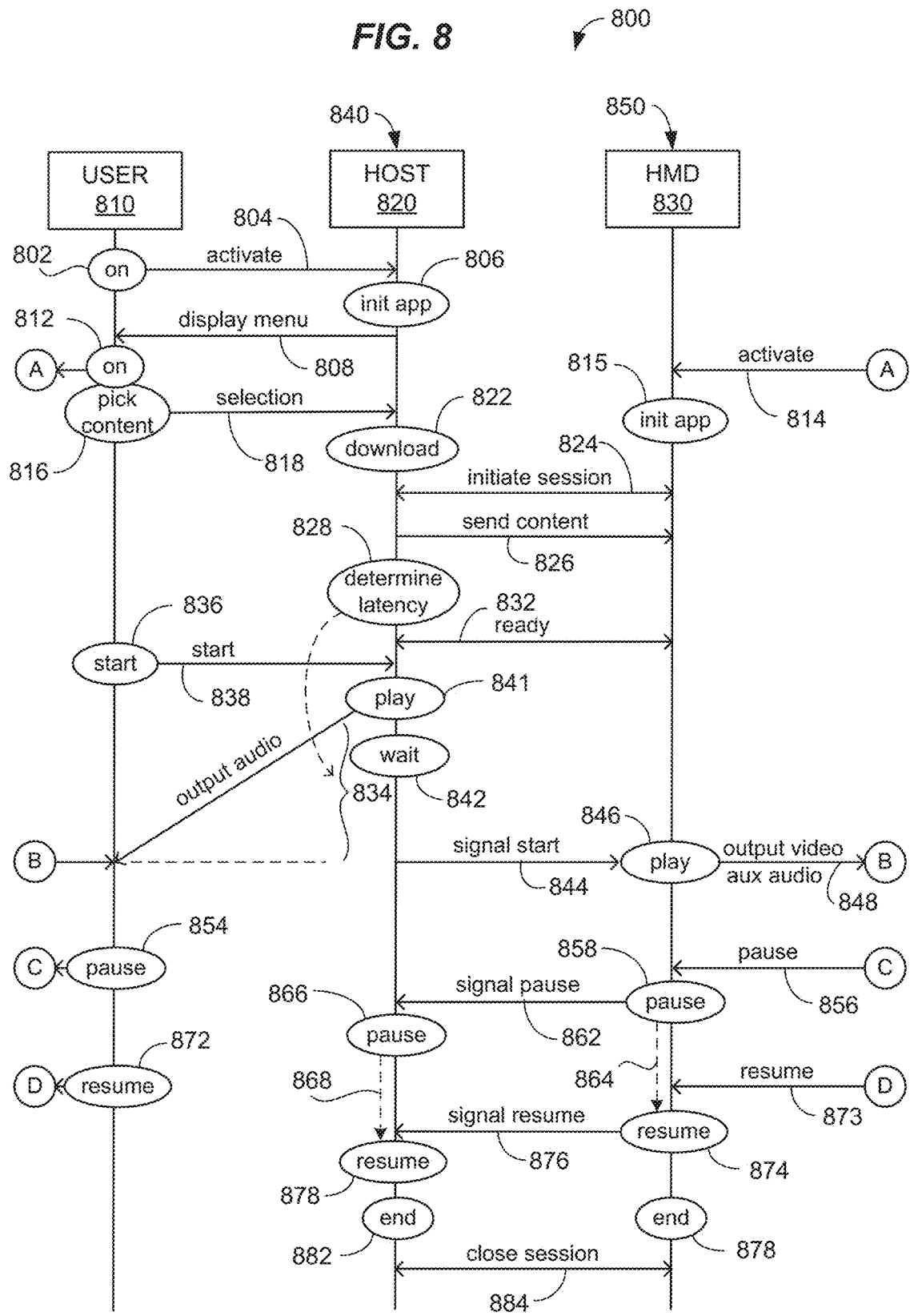
FIG. 8 is a sequence diagram illustrating alternative aspects of the method for media management and playback in a system as described herein, and methods performed by components of the system.

In accordance with the foregoing, and by way of further explanation, FIG. 8 shows certain illustrative aspects of the foregoing methods in a system as described herein, including methods 840, 850 performed by components of a system including a host player device 820 and HMD player device 830, and a combination method 800 interacting with a user 810 of both player devices 820, 830. At 802, the user 810 interacts 802 with an 'on' feature of a user interface, activating 804 the host player device 820. The 'on' feature may be incorporated in the host device 820 or in the HMD player device 830. At 806, the host player device 820 initiates a playback management application 806, for example an AudioSync Director application as described herein above, which may display or otherwise output 808 a menu interface for user selection of digital audio-video content for contemporaneous play by the host player device

820 and the HMD player device 830. The method 840 performed by the host device 820 may be controlled or initiated by the playback management application.

At some time prior to beginning the contemporaneous playback, shown here at 812, the user may activate 814 the HMD player device, for example by putting it on and activating a switch. One the HMD player device 830 is activated by the user, it may load into its memory and initiate execution 815 of a companion playback management application, for example a companion application configured to work with an AudioSync Director application, which may enable the HMD device 830 to perform operations of the method 850.

The user 810 may access a content selection interface served by either or both of the host player device 820 or the HMD player device 830. At 816, the user selects an audio-video title to be played, which title may be contained in a digital audio-video content as described herein above, causing an indication 818 of a title selected for playback to be provided to the host player device 820. At 822, if the digital audio-video content for the selected title is not already present in its local memory, the host player device 820 may download the content from a content server (not shown). At 824, the host player device 820 in cooperation with the HMD player device 830 initiate a playback session 824. Initiating a session 824 may include, for example, establishing a wireless data connection (e.g., Wi-Fi or Bluetooth), and executing a handshake protocol between the playback management applications on the two player devices 820, 830.

At 826, the host player device 820 may transmit a copy of the digital audio-video content to the HMD player device 830 via the wireless data connection supporting the playback session. Optionally, the host playback device may record relevant metadata concerning the title, destination, and time/date for use in content management, and/or may transmit relevant metadata to a content management server.

At 828, the host player device 820 may determine a latency value for the HMD player device 830. The latency value may be a characteristic, stable value that is measured only once or only occasionally, and retained 834 in a memory of the host player device 820 and/or HMD player device 830. Examples of methods 900, 1000 for measuring latency are described in connection with FIGS. 9 and 10. Once both players 820, 830 have copies of the content to be played in their respective local memories and the latency is determined and in a memory of the host player device 820, the host 820 and HMD 830 exchange signals 832 indicating they are both ready for playback to begin.

At 836, the user 810 via an interface of the host player device 820 provides a "start play" instruction 838 to the HMD player device 830. Upon receiving the instruction 838, the host player device 820 initiates play 841 of the digital audio-video content. Upon receiving the start signal 838, the host player device 820 starts a timer 842 for a wait period 834 based on (e.g., equal to) the determined latency value. During the wait period 834, the delay 834 is introduced by signal transmission and processing as described herein above.

At 844, the wait timer 842 expires and the host player device 820 sends a signal via the wireless data connection to the HMD player device 830 instructing the HMD player device to begin playback. Upon receiving the start signal, the HMD player device initiates playback, displaying video output 848 which is visible to the user 810 at the same time as the audio output by the external sound system.

The synchronization between the audio output by the host player device 820 and the HMD player device may be maintained if the user 810 pauses the playback, as shown beginning at 854. Here, the user activates a pause feature of the HMD device's user interface, causing it to receive 856 a "pause" instruction. Upon receiving the pause instruction, the HMD device 830 pauses playback and contemporaneously signals a pause instruction 862 to the host player device 820. The HMD player device 830 maintains the pause position in its memory 864, while the host player device 820 maintains the pause position 868 in its memory. Thus, synchronization of the audio and video is maintained during the pause.

At 872, the user 810 activates a "resume" feature 872 of the HMD user interface, sending a resume instruction 873 to the HMD. The HMD resumes play at 874 and contemporaneously sends a resume instruction 876 to the host player device, which may immediately resume audio playback 878 at the stored 868 pause position. In an alternative, if the HMD player device 830 is characterized by additional latency when resuming play after a pause, the host player device 820 may wait for a period based on a determined latency before resuming audio output, as previously described. After play is resumed, synchronized playback by both player devices 820, 830 continues until the end of the digital content is reached or the user terminates play.

After completing play, the players 820, 830 may cooperate to close the playback session and enforce any applicable content license or security requirements, as described herein.

Figure 9:
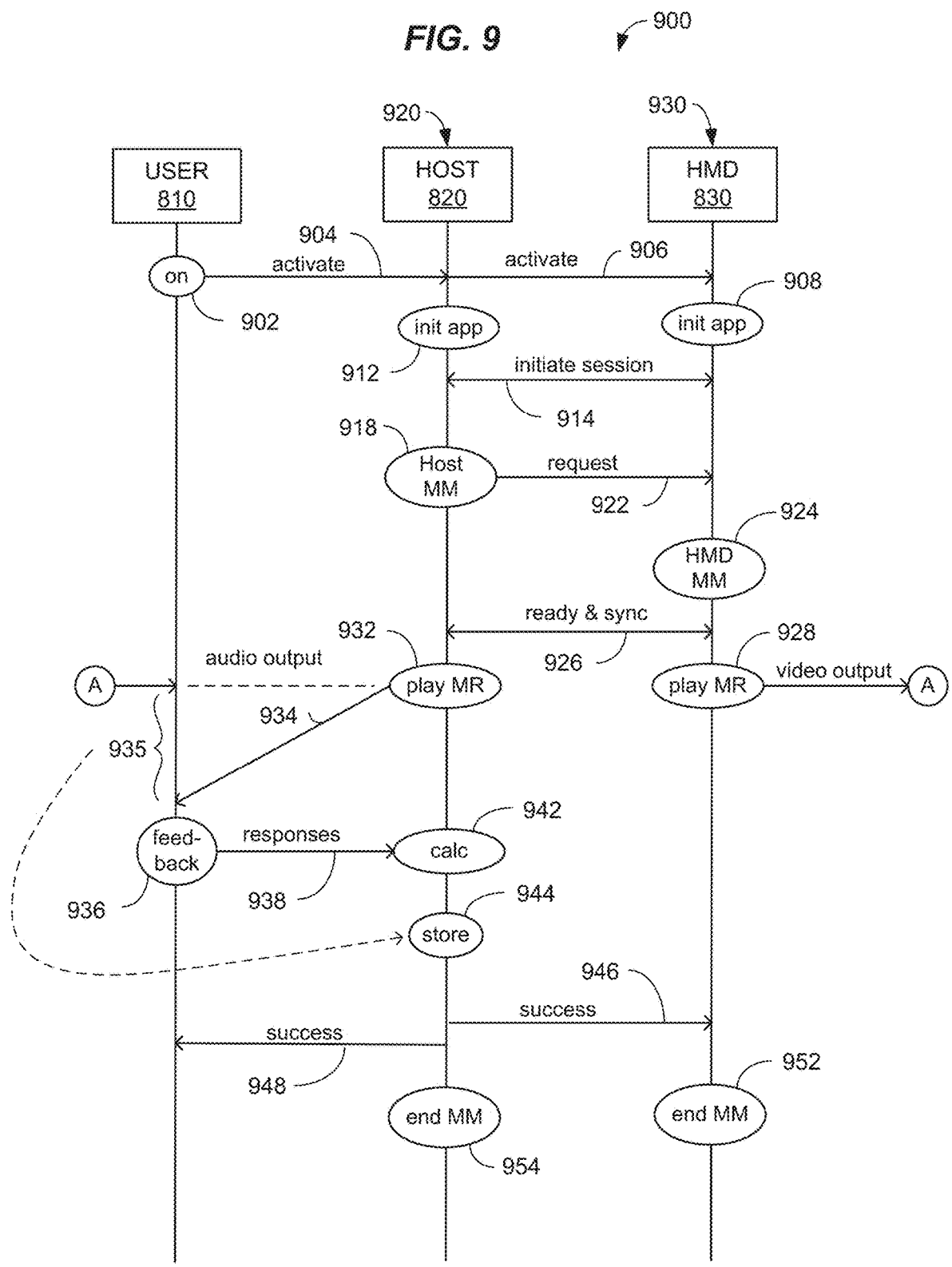
FIG. 9 is a sequence diagram illustrating a method for determining a latency value for use in playback management in a system as described herein, and methods performed by components of the system.

FIG. 9 shows a method 900 for determining a latency value for use in playback management in a system as described herein, comprising methods 820, 830 performed by components 820, 830 of the system, respectively. At 902, the user activates 904 the host player device 820, such as by using a remote control user interface (UI) device. In turn, the host player device activates 906 the HMD player device. At 912 the host player device begins execution of an application, for example the AudioSync Director, that includes a Measurement Module (MM) 918 for latency determination. Likewise, at 908 the HMD player device initiates an application, for example the companion application, that includes a Measurement Module (MM) 924 for latency determination. After initiating the MM at 918, the host player device requests that the HMD player device begin execution of its measurement module, and the HMD player device does so at 924. The host 820 and HMD 830 then sync up and signal mutual readiness to begin latency determination, at 926.

At 932, the host player device begins playback 932 of a measurement recording (MR) used for latency measurement. Sometime prior to this, the host 820 supplies a copy of the MR to the HMD 830 as previously described for digital audio-video content. The MR may include an introductory portion that instructs the user to provide feedback 936 upon hearing specified audio output from the external sound system after seeing a specified visual event in the HMD 830 output. For example, the instructions might say "press enter as soon as you hear a beep from the sound system after the screen flashes." This feedback 936 provides an indication of the delay 935 in output of the test audio signal 934. The feedback routine may be repeated several times to obtain an aggregate estimate of the delay 935 perceived by the user. Each time the host 820 receives a user input response at 938. At 942, the host may calculate an estimate of the latency value, for example taking an average of the user feedback after adjustments for greater accuracy.

At 944, the host player device 820 may store the calculated latency value in a non-volatile memory location for use during content playback, as described in connection with the methods herein above. At 946, 948 the host device may inform the user 810 and the HMD 830 that the measurement is successfully completed. At 954, the host player device may terminate the MM 954. The HMD player device terminates the MM at 952.

Figure 10:
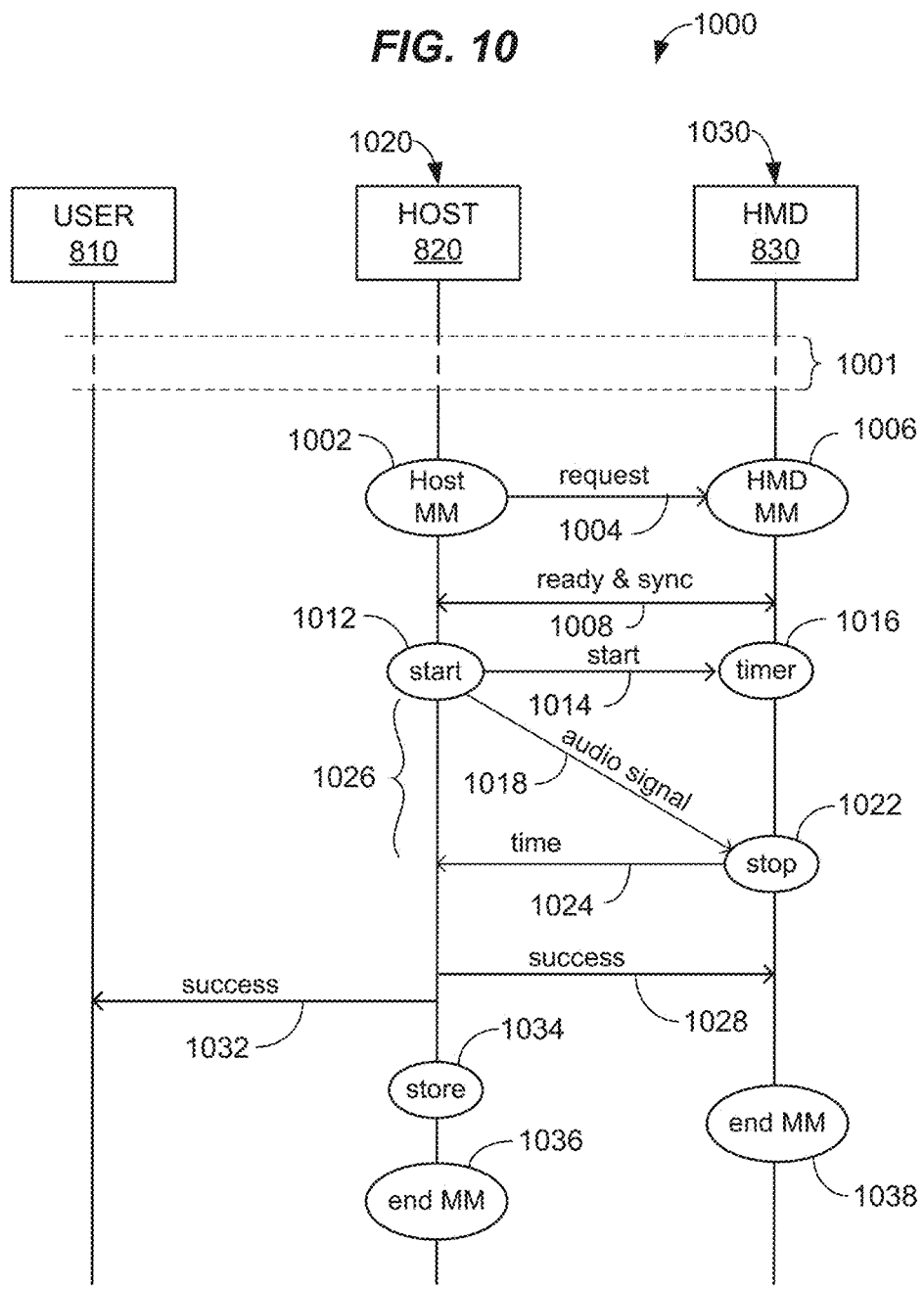
FIG. 10 is a sequence diagram illustrating an alternative method for determining a latency value for use in playback management in a system as described herein, and methods performed by components of the system.

FIG. 10 shows an alternative method 1000 for determining a latency value for use in playback management in a system as described herein, and methods 1020, 1030 performed by components 320, 830 of the system, respectively. The first portion 1001 of the method 1000 may be the same as steps 902-926 of method 900.

At 1002, the host player device 820 initiates a measurement module (MM) and instructs the HMD player device 830 to initiate a corresponding HMD-side MM, which the HMD does at 1006. At 1008, the host 820 and HMD 830 exchange signals indicating mutual readiness to begin latency determination.

At 1012, the host 820 starts play of test content and simultaneously instructs 1024 the HMD 830 to start a timer 1016. At 1018, the audio output by the host 820 is transmitted and processed through the external sound system, introducing a delay 1026 for reasons explained hereinabove until the audio signal reaches the HMD 830. At 1022, the HMD detects the audio signal using its microphone and stops the timer. At 1024, the HMD 830 send the timer value when stopped to the host player device 820, indicating the amount of delay 1026. At 1028, 1032 the host player device signals that the delay is successful to the user 810 and HMD player device 830.

At 1034, the host player device stores the latency value 1026 for later use as described herein and terminates the measurement module 1036. At 1038, the HMD player device likewise terminates its measurement module.

Figure 11:
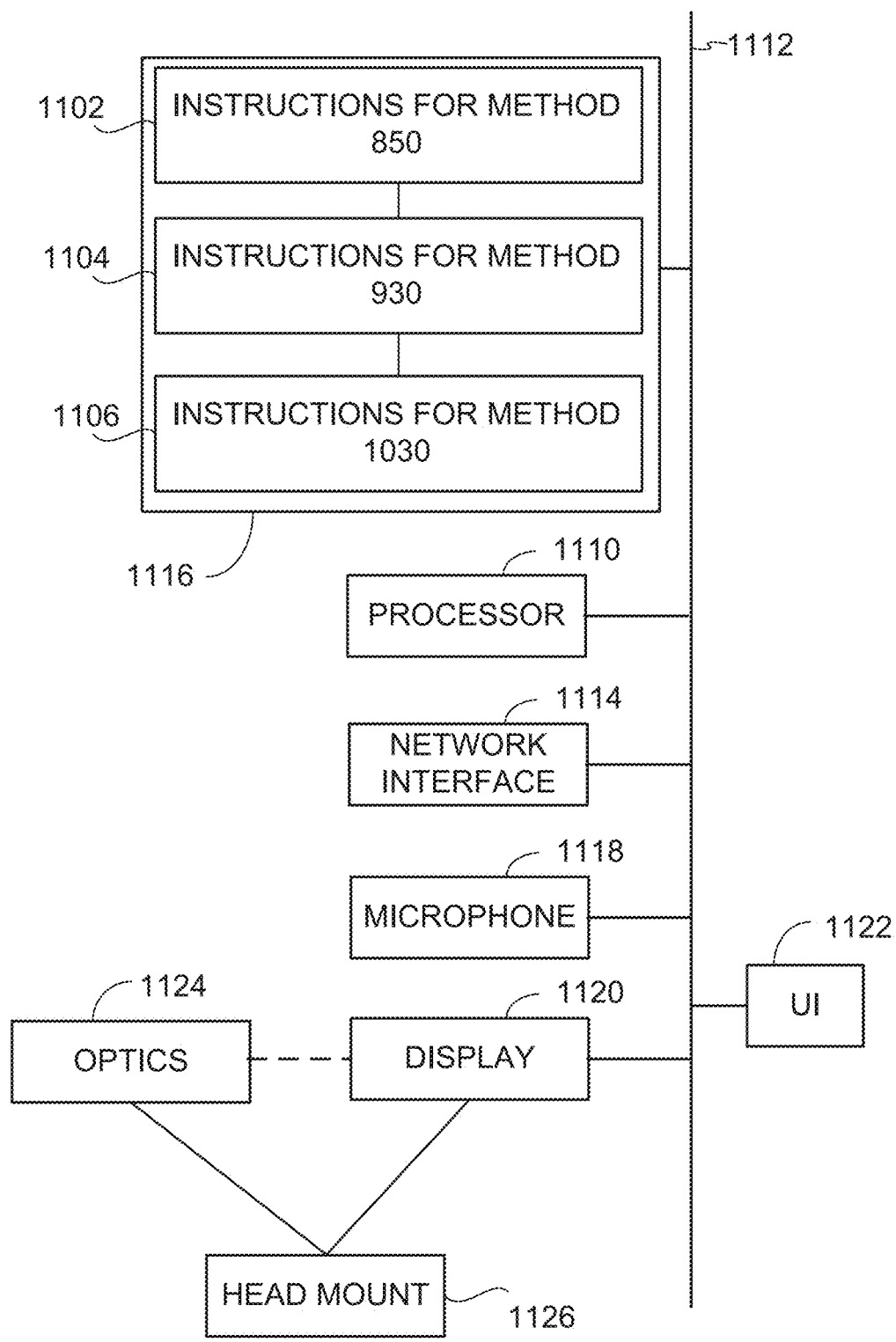
FIG. 11 is a conceptual block diagram illustrating components of an apparatus or system for a host player device.

FIG. 11 is a conceptual block diagram illustrating components of a virtual reality wireless immersive audio and video player, also called an HMD player device as described herein, according to one embodiment. As depicted, the apparatus 1100 may include functional blocks that can represent functions implemented by a processor, software, or combination thereof (e.g., firmware).

The apparatus or system 1100 may comprise an electrical component 1102 for performing operation of the method 850 shown in FIG. 8. The component 1102 may be, or may include, a means for said performing. Said means may include the processor 1110 coupled to the memory 1116, and to the network interface 1114, the processor executing an algorithm based on program instructions stored in the memory. Such algorithm may include a sequence of more detailed operations, for example, as detailed in FIG. 8 at 850.

The apparatus or system 1100 may comprise an electrical component 1104 for performing operation of the method 930 shown in FIG. 9. The component 1103 may be, or may include, a means for said performing. Said means may include the processor 1110 coupled to the memory 1116, and to the network interface 1114, the processor executing an algorithm based on program instructions stored in the memory. Such algorithm may include a sequence of more detailed operations, for example, as detailed in FIG. 9 at 930.

The apparatus or system 1100 may comprise an electrical component 1106 for performing operation of the method 1030 shown in FIG. 10. The component 1106 may be, or may include, a means for said performing. Said means may include the processor 1110 coupled to the memory 1116, and to the network interface 1114, the processor executing an algorithm based on program instructions stored in the memory. Such algorithm may include a sequence of more detailed operations, for example, as detailed in FIG. 10 at 1030.

The apparatus 1100 may optionally include a processor module 1110 having at least one processor, in the case of the apparatus 1100 configured as a data processor. The processor 1110, in such case, may be in operative communication with the modules 1102-1106 via a bus 1112 or other communication coupling, for example, a network. The processor 1110 may effect initiation and scheduling of the processes or functions performed by electrical components 1102-1106.

In related aspects, the apparatus 1100 may include a network interface module 1114 operable for communicating with a storage device over a computer network. In further related aspects, the apparatus 1100 may optionally include a module for storing information, such as, for example, a memory device/module 1116. The computer readable medium or the memory module 1116 may be operatively coupled to the other components of the apparatus 1100 via the bus 1112 or the like. The memory module 1116 may be adapted to store computer readable instructions and data for effecting the processes and behavior of the modules 1102-1106, and subcomponents thereof, or the processor 1110. The memory module 1116 may retain instructions for executing functions associated with the modules 1102-1106 and other operations of an HMD player device as described herein. While shown as being external to the memory 1116, it is to be understood that the modules 1102-1106 can exist within the memory 1116.

The apparatus 1100 may further include a microphone 1118, a stereoscopic display device 1120, and a user interface device 1122 each coupled to the processor 1110 and memory 1116 via the bus 1112 or other coupling. The apparatus may further include an optical train 1124 through which the user views the stereoscopic display 1120 via a mechanical coupling included in a head mount structure 1126, typically including a case, cushioning, and elastic band.

FIG. 12 is a conceptual block diagram illustrating components of an apparatus 1200 for a host player device as described herein, according to one embodiment. As depicted, the apparatus 1200 may include functional blocks that can represent functions implemented by a processor, software, or combination thereof (e.g., firmware).

The apparatus or system 1200 may comprise an electrical component 1202 for performing operation of the method 840 shown in FIG. 8. The component 1202 may be, or may include, a means for said performing. Said means may include the processor 1210 coupled to the memory 1216, and to the network interface 1214, the processor executing an algorithm based on program instructions stored in the memory. Such algorithm may include a sequence of more detailed operations, for example, as detailed in FIG. 8 at 840.

The apparatus or system 1200 may comprise an electrical component 1204 for performing operation of the method 920 shown in FIG. 9. The component 1203 may be, or may include, a means for said performing. Said means may include the processor 1210 coupled to the memory 1216, and to the network interface 1214, the processor executing an algorithm based on program instructions stored in the memory. Such algorithm may include a sequence of more detailed operations, for example, as detailed in FIG. 9 at 920.

The apparatus or system 1200 may comprise an electrical component 1206 for performing operation of the method 1020 shown in FIG. 10. The component 1206 may be, or may include, a means for said performing. Said means may include the processor 1210 coupled to the memory 1216, and to the network interface 1214, the processor executing an algorithm based on program instructions stored in the memory. Such algorithm may include a sequence of more detailed operations, for example, as detailed in FIG. 10 at 1020.

The apparatus 1200 may optionally include a processor module 1210 having at least one processor, in the case of the apparatus 1200 configured as a data processor. The processor 1210, in such case, may be in operative communication with the modules 1202-1206 via a bus 1212 or other communication coupling, for example, a network. The processor 1210 may effect initiation and scheduling of the processes or functions performed by electrical components 1202-1206.

In related aspects, the apparatus 1200 may include a network interface module 1214 operable for communicating with a storage device over a computer network. In further related aspects, the apparatus 1200 may optionally include a module for storing information, such as, for example, a memory device/module 1216. The computer readable medium or the memory module 1216 may be operatively coupled to the other components of the apparatus 1200 via the bus 1212 or the like. The memory module 1216 may be adapted to store computer readable instructions and data for effecting the processes and behavior of the modules 1202-1206, and subcomponents thereof, or the processor 1210. The memory module 1216 may retain instructions for executing functions associated with the modules 1202-1206, and other operations of a host player device as described hereinabove. While shown as being external to the memory 1216, it is to be understood that the modules 1202-1206 can exist within the memory 1216.

The apparatus 1200 may further include an audio output port 1120 as described hereinabove for providing an audio signal to an external sound system. The apparatus 1200 may include a user interface 1222 as is conventional in the art.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Program instructions may be written in any suitable high-level language, for example, C, C++, C #, JavaScript, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "processor" encompasses any one or functional combination of the foregoing examples.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for synchronizing audio output by an external sound system driven by a host player device with video output from a head-mounted display (HMD) player device, the method comprising:
    establishing a session between the host player device and the HMD player device, wherein the host player device is coupled to an external sound system and the HMD player device comprises a video output system;
    determining, by at least one of the host player device or HMD player device, a latency period between audio output from the external sound system and corresponding video output from the HMD player device, wherein the determining is based on both the host and HMD player devices simultaneously initiating play of test content;
    providing, by the host player device, both the host and HMD player devices with access to identical digital audio-video content selected by a user;
    initiating play of the digital audio-video content by the host player device for audio output by the external sound system; and
    initiating play of the digital audio-video content by the HMD player device after waiting for the latency period so that audio output by the external sound system is synchronized with video output from the HMD player device.

2. The method of claim 1, wherein the determining comprises determining the latency period based on user input received by the host player device in response to contemporaneous output of the test content from the host and HMD player devices.

3. The method of claim 1, wherein the determining comprises determining the latency period based on detecting, by at least one of the host player device or HMD player device, a lag between audio output from the external sound system and corresponding video output from the HMD player device, wherein both the host and HMD player devices simultaneously initiate play of the test content.

4. The method of claim 3, wherein the host player device sends a wireless signal to the HMD player device to instruct initiation of the corresponding video output.

5. The method of claim 4, wherein the signal comprises at least one of an audio signal or an optical signal emitted by the external sound system.

6. The method of claim 1, wherein establishing a session further comprises verifying a connection between the first and second applications.

7. The method of claim 1, wherein establishing the session is performed over a Wi-Fi connection.

8. The method of claim 1, further comprising signaling by the HMD player device to the host player device that the HMD player device is ready to play content.

9. The method of claim 1, further comprising ensuring, by the host player device in cooperation with the HMD player device, that the host player device and the HMD player device contain identical copies of the digital audio-video content.

10. The method of claim 9, wherein the ensuring further comprises querying by the host player device whether the memory of the HMD player device contains a copy of the digital audio-video content.

11. The method of claim 9, wherein the ensuring further comprises copying the content to be played from the host player device to the HMD player device.

12. The method of claim 1, further comprising causing deletion after play, by at least one of host player device or the HMD player device, of the digital audio-video content on the HMD player device based on satisfaction of a predetermined condition.

13. The method of claim 12, wherein the predetermined condition comprises at least one of: number of plays, a time-period, or a license type.

14. The method of claim 1, further comprising displaying by the host player device at least one of: a navigation screen with playback controls and latency compensation, video output of the digital audio-video content, overlaid navigation controls, or a 3D video output version of the digital audio-video content.

15. The method of claim 1, wherein the external sound system comprises a home theater system.

16. An apparatus for synchronizing audio output by an external sound system driven by a host player device with video output from a head-mounted display (HMD) player device, comprising at least one processor coupled to a memory, the memory holding program instructions, that when executed by the at least one processor, cause the apparatus to perform:
    establishing a session between the host player device and the HMD player device;
    determining a latency period between audio output from the external sound system and corresponding video output from the HMD player device;
    providing both the host and HMD player devices with access to identical digital audio-video content selected by a user;
    initiating play of the digital audio-video content for audio output by the external sound system; and
    causing play of the digital audio-video content to be initiated by the HMD player device after waiting for the latency period so that audio output by the external sound system driven is synchronized with video output from the HMD player device.

17. The apparatus of claim 16, wherein the memory holds further instructions for the determining at tat least in part by determining the latency period based on user input received in response to contemporaneous output of the test content from the host and HMD player devices.

18. The apparatus of claim 16, wherein the memory holds further instructions for the determining the latency period at least in part by detecting a lag between audio output from the external sound system and corresponding video output from the HMD player device, wherein both the host and HMD player devices simultaneously initiate play of the test content.

19. The apparatus of claim 16, wherein the memory holds further instructions for sending a signal to the HMD player device to instruct initiation of the corresponding video output.

20. The apparatus of claim 16, wherein the memory holds further instructions for the determining based on both the host and HMD player devices simultaneously initiating play of test content.

* * * * *